United States Patent [19]

Gessner et al.

[11] Patent Number: 5,792,879
[45] Date of Patent: *Aug. 11, 1998

[54] PREPARATION OF DI-OR TRIARYLMETHANE DYES BY OXIDATION

[75] Inventors: Thomas Gessner, Heidelberg; Udo Mayer, Frankenthal, both of Germany

[73] Assignee: BASF Aktiengesellschaft, Ludwigshafen, Germany

[*] Notice: The term of this patent shall not extend beyond the expiration date of Pat. No. 5,659,053.

[21] Appl. No.: 864,720

[22] Filed: May 28, 1997

Related U.S. Application Data

[63] Continuation of Ser. No. 615,065, Mar. 13, 1996, Pat. No. 5,659,053, which is a continuation of Ser. No. 288,883, Aug. 10, 1994, abandoned, which is a continuation of Ser. No. 38,815, Mar. 29, 1993, abandoned.

[30] Foreign Application Priority Data

Apr. 8, 1992 [DE] Germany .................. 42 11 783.6

[51] Int. Cl.⁶ .................. C09B 11/04; C09B 11/10
[52] U.S. Cl. .................. 552/108; 552/109; 552/110; 552/113; 552/114; 564/330
[58] Field of Search .................. 564/330; 552/113, 552/114, 108, 109, 110

[56] References Cited

U.S. PATENT DOCUMENTS 4,000,135  12/1976  Kast .
5,659,053  8/1997  Gessner et al. .

FOREIGN PATENT DOCUMENTS 0 330 149    8/1989   European Pat. Off. .
3 005 397    8/1980   Germany .
WO 91 01985  2/1991   WIPO .

OTHER PUBLICATIONS

Chemical Abstracts, AM–48849, JP–A–56–848, May 20, 1981.

Chemistry Letters, pp. 1217–1220, Apr. 15, 1996, E. Kimura et al., "The Proximal Imidazole Effect on Manganese(III)–Cyclan Complex".

Kontakte 1985, vol. 3, pp. 38–48, D. Wohrle et al, "Phthalocyamine–EIM System Ungewohnlicher Struktur und Eigenschaften".

Chemical Abstracts, AN–90–095402, & JP–A–2–47160, Feb. 16, 1990.

Chemical Abstracts, AN–57396, JP–A–53–074–530, Jul. 3, 1978.

*Primary Examiner*—Alan Siegel
*Attorney, Agent, or Firm*—Oblon, Spivak, McClelland, Maier & Neustadt, P.C.

[57] ABSTRACT

A process for preparing di- or triarylmethane dyes by oxidation of di- or triarylmethanes in the presence of a diluent and of an oxygen transfer catalyst that contains a complexed heavy metal ion comprises using as oxidizing agent hydrogen peroxide, a hydrogen peroxide donor compound, an organic hydroperoxide or a percarboxylic acid and as the oxygen transfer catalyst a member of the class of the porphyrins, tetraaza[14]annulenes, phthalocyanines or tetraazacyclotetradecanes.

8 Claims, No Drawings

PREPARATION OF DI- OR TRIARYLMETHANE DYES BY OXIDATION

This is a Continuation of application Ser. No. 08/615,065 filed Mar. 13, 1996, now U.S. Pat. No. 5,659,053, which is a continuation of application Ser. No. 08/288,883, filed Aug. 10, 1994, abandoned, which is a continuation of application Ser. No. 08/038,815, filed Mar. 29, 1993, abandoned.

The present invention relates to a novel process for preparing di- or triarylmethane dyes by oxidation of di- or triarylmethanes in the presence of a diluent and of an oxygen transfer catalyst that contains a complexed heavy metal ion.

JP-A-74 530/1978 discloses the preparation of triarylmethane dyes by oxidation of triarylmethanes with hydrogen peroxide in the presence of copper(II) sulfate, eg. copper sulfate or copper chloride. Furthermore, JP-A-57 848/1981 describes carrying out the oxidation process with hydrogen peroxide, chloranil and a metal compound, eg. copper(I) bromide or vanadium pentoxide.

According to the embodiment examples of JP-A-57 848/1981, the oxidation of carboxyl-containing triarylmethanes to phthalides with oxygen as oxidizing agent takes place in the presence of iron(II) chloride, manganese(II) sulfate and ethylenediaminetetraacetic acid.

Finally, DE-A-3 0 05 397 discloses the preparation of 3,3-bis(4-dimethylaminophenyl)-6-dimethylaminophthalide by oxidation of the corresponding diarylmethane with hydrogen peroxide in the presence of a cobalt complex of azo dyes.

It has been found that the prior art processes still have defects. For instance, the processes mentioned are not universally usable for preparing di- or triarylmethane dyes.

It is an object of the present invention to provide a novel process for preparing di- or triarylmethane dyes which starts with the corresponding di- or triarylmethanes and is carried out in the presence of an oxygen-transferring catalyst that contains a complexed heavy metal. The novel process shall produce the target products in a simple manner and in high yield and purity.

We have found that this object is achieved by a process for preparing dyes of the formula I

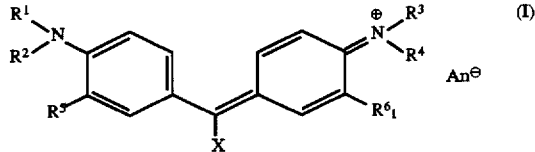

where $R^1$, $R^2$, $R^3$ and $R^4$ are independently of one another $C_1$–$C_8$-alkyl, which may be substituted and may be interrupted by from 1 to 3 oxygen atoms in the ether function, phenyl or $C_1$–$C_4$-alkylphenyl, $R^5$ and $R^6$ are independently of one another hydrogen or methyl, X is hydrogen, substituted or unsubstituted phenyl or substituted or unsubstituted naphthyl, and An$\ominus$ is the equivalent of an anion, by oxidation of a leuco compound of the formula II

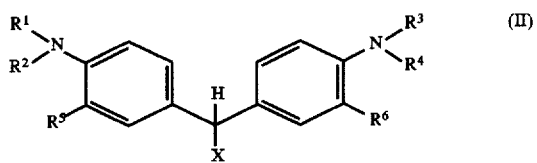

where $R^1$, $R^2$, $R^3$, $R^4$, $R^5$, $R^6$ and X are each as defined above, in the presence of a diluent and of an oxygen transfer catalyst which contains a complexed heavy metal ion, which comprises using as oxidizing agent hydrogen peroxide, a hydrogen peroxide donor compound, an organic hydroperoxide or a percarboxylic acid and as the oxygen transfer catalyst a member of the class of the porphyrins, tetraaza[14]annulenes, phthalocyanines or tetraazacyclodecanes.

Any alkyl groups appearing in the abovementioned formulae I and II can be straight-chain or branched.

Any substituted alkyl groups appearing in the abovementioned formulae I and II may have as substituents for example hydroxyl, chlorine, cyano, phenyl or hydroxysulfonylphenyl.

Any substituted phenyl groups appearing in the abovementioned formulae I and II may have as substituents for example methyl, chlorine, amino, $C_1$–$C_4$-mono- or dialkylamino, mono- or diphenylamino, hydroxyl, $C_1$–$C_4$-alkoxy or hydroxysulfonyl.

Any substituted naphthyl groups appearing in the abovementioned formulae I and II may have as substituents for example amino, $C_1$–$C_4$-mono- or dialkylamino, mono- or diphenylamino or hydroxysulfonyl.

Any substituted alkyl, phenyl or naphthyl groups appearing in the abovementioned formula are in general monosubstituted, disubstituted or trisubstituted, preferably monosubstituted or disubstituted.

Suitable radicals $R^1$, $R^2$, $R^3$ and $R^4$ are for example methyl, ethyl, propyl, isopropyl, butyl, isobutyl, secbutyl, pentyl, isopentyl, neopentyl, tert-pentyl, hexyl, heptyl, octyl, 2-ethylhexyl, 2-hydroxyethyl, 2- or 3-hydroxypropyl, 2- or 4-hydroxybutyl, 2-chloroethyl, 2- or 3-chloropropyl, 2- or 4-chlorobutyl, 2-cyanoethyl, 2- or 3-cyanopropyl, 2- or 4-cyanobutyl, benzyl, 1- or 2-phenylethyl, hydroxysulfonylbenzyl, hydroxysulfonylphenylethyl, 2-methoxyethyl, 2-ethoxyethyl, 2- or 3-methoxypropyl, 2- or 3-ethoxypropyl, 2- or 4-methoxybutyl, 2- or 4-ethoxybutyl, 3,6-dioxaheptyl, 3,6-dioxaoctyl, 4,8-dioxanonyl, 3,7-dioxaoctyl, 3,7-dioxanonyl, 4,7-dioxaoctyl, 4,7-dioxanonyl, 4,8-dioxadecyl, 5-hydroxy-3-oxapentyl, 5-hydroxy-1,4-dimethyl-3-oxapentyl, 8-hydroxy-3,6-dioxaoctyl or 11-hydroxy-3,6,9-trioxaundecyl phenyl, 1-,2- or 3-methylphenyl or 1-,2- or 3-ethylphenyl.

Suitable X is for example phenyl, 2-, 3- or 4-methylphenyl, 2,4-dimethylphenyl, 2-, 3- or 4-chlorophenyl, 2,4- or 2,6- dichlorophenyl, 2-, 3- or 4-aminophenyl, 2-, 3- or 4-mono- or dimethylaminophenyl, 2-,3- or 4-mono- or diphenylaminophenyl, 2-, 3- or 4-hydroxyphenyl, 2-, 3- or 4-methoxyphenyl, 2,4-dimethoxyphenyl, 2-, 3- or 4-hydroxysulfonylphenyl, 2,4-dihydroxysulfonylphenyl, 2,4-dihydroxysulfonyl-5-hydroxyphenyl, aminonaphthyl, mono- or dimethylaminonaphthyl, mono- or diphenylaminonaphthyl or hydroxysulfonylnaphthyl.

Suitable anions are for example fluoride, chloride, bromide, iodide, hydrogensulfate, sulfate, tetrafluoroborate, formate, acetate, propionate, mono-, di- or trichloroacetate, lactate, methoxyacetate, citrate, succinate, methylsulfonate, benzenesulfonate and 2- or 4-methylbenzenesulfonate.

When the dyes of the formula I have hydroxysulfonyl radicals and are in the salt form, suitable counter-ions are metal or ammonium ions. Metal ions are in particular the lithium, sodium or potassium ions. Ammonium ions for the purposes of the present invention are either substituted or unsubstituted ammonium cations. Substituted ammonium cations are for example monoalkyl-, dialkyl-, trialkyl-, tetraalkyl- or benzyltrialkylammonium cations or cations derived from nitrogen-containing five- or six-membered saturated heterocycles, such as pyrrolidinium, piperidinium, morpholinium, piperazinium or N-alkylpiperazinium cations or their N-monoalkyl- or N,N-dialkyl-substituted products. Alkyl is here to be understood as meaning in general straight-chain or branched $C_1-C_{20}$-alkyl which may substituted by hydroxyl groups and/or interrupted by oxygen atoms in ether function.

Sodium and potassium ions are preferred.

Preference is given to a process for preparing dyes of the formula I where $R^5$ and $R^6$ are each hydrogen.

Preference is further given to a process for preparing dyes of the formula I where $R^1$, $R^2$, $R^3$ and $R^4$ are each substituted or unsubstituted $C_1-C_4$-alkyl in particular hydroxyl- or hydroxysulfonyl phenyl-substituted $C_1-C_4$-alkyl.

Particular preference is given to a process for preparing dyes of the formula I where X is hydrogen or substituted or unsubstituted phenyl, in particular chlorine- or hydroxysulfonyl-substituted phenyl.

Particular preference is further given to a process for preparing dyes of the formula I where $R^1$, $R^2$, $R^3$ and $R^4$ are each $C_1-C_4$-alkyl, $C_2-C_4$-hydroxyalkyl or hydroxysulfonylbenzyl.

Of particular note is a process for preparing dyes of the formula I in which $R^1$ and $R^3$ are each ethyl, $R^2$ and $R^4$ are each hydroxysulfonylbenzyl, $R^5$ and $R^6$ are each hydrogen, and X is hydroxysulfonyl-substituted phenyl.

Suitable catalysts which transfer oxygen and contain a complexed heavy metal ion are for example members of the class of the porphyrins, tetraaza[14]annulenes, phthalocyanines or tetraazacyclotetradecanes.

The complexed heavy metal ions are derived for example from iron, manganese, cobalt or chromium. The heavy metal ions are in general 2- or 3-valent.

Compounds of this type are known per se and described for example in DE-A-2 427 606, WO-A-91/01985, Kontakte 1985, 38, or in Chem. Lett. 1991, 1217.

They conform for example to the following formulae:

Porphyrins:

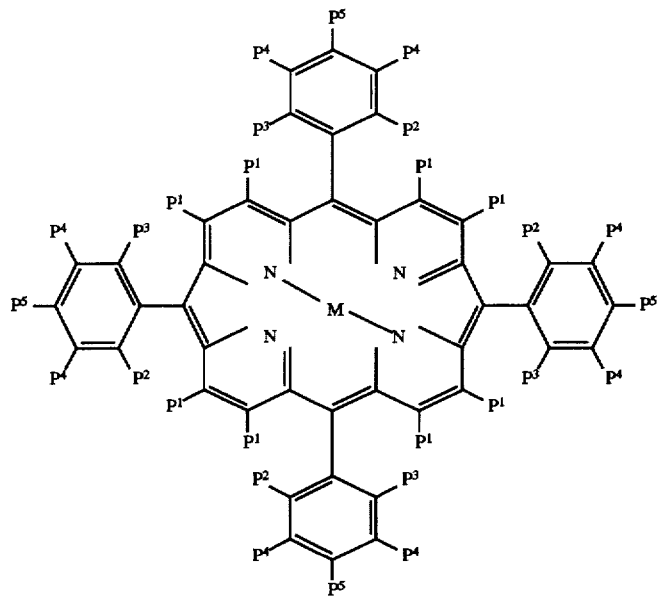

$p^1$=hydrogen, methyl, ethyl, chlorine or bromine $p^2$, $p^3$, $p^4$, $p^5$=hydrogen, methyl, hydroxysulfonyl or $C^1-C_4$-alkoxy M=iron, manganese, cobalt or chromium.

Tetraaza[14]annulenes:

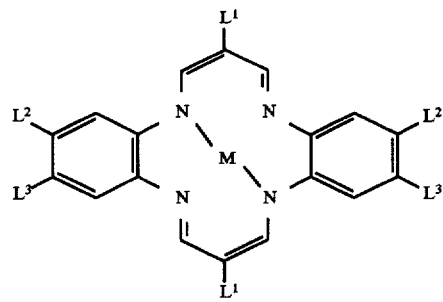

$L^1$=hydrogen, $C_1-C_8$-alkyl, chlorine, $C_1-C_4$-alkoxy, substituted or unsubstituted phenyl, substituted or unsubstituted phenylazo, $C_1-C_4$-alkoxycarbonyl or unsubstituted or $C_1-C_4$-alkyl-, carboxyl-, $C_1-C_4$-alkoxycarbonyl- or carbamoyl-substituted pyridylium $L^2$, $L^3$=hydrogen, methyl or $L^2$ and $L^3$ together=a fused benzo ring M=iron, manganese, cobalt or chromium.

Phthalocyanines:

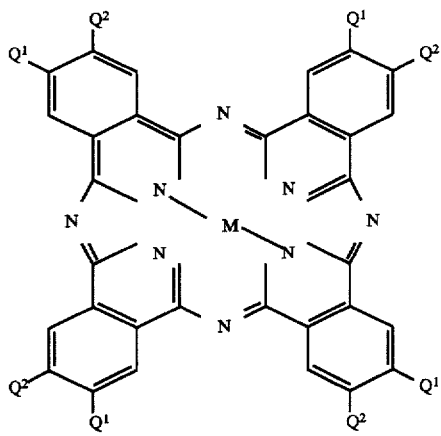

$Q^1$, $Q^2$=$C_1$-$C_4$-alkyl, chlorine, bromine, $C_1$-$C_4$-alkoxy or $Q^1$ and $Q^2$ together=a fused benzo ring
M=iron, manganese, cobalt or chromium.
Tetraazacyclotetradecanes:

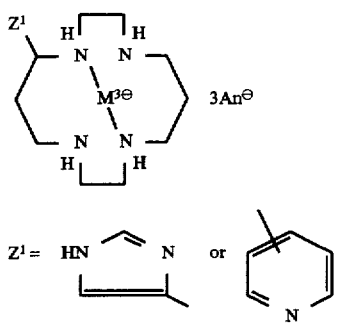

An$^\ominus$=equivalent of an anion
M=iron, manganese, cobalt or chromium.

Preference is given to the use of catalysts of the class of the tetraaza[14]annulenes or phthalocyanines.

Preference is further given to the use of catalysts containing a complexed iron ion.

Particular preference is given to the use of iron tetraaza [14]annulenes or iron phthalocyanines as catalysts.

Very particular preference is given to the use of iron-5, 14-dihydrodibenzo[b,i][5,9,14,18]tetraaza[14]annulene or iron phthalocyanine as catalyst.

The catalysts can be used homogeneously or heterogeneously in solution. Similarly, they may be immobilized on a carrier material, for example silica gel or ion exchanger resin.

The oxidizing agent used in the process of the invention is hydrogen peroxide, a hydrogen peroxide donor compound, an organic hydroperoxide or a percarboxylic acid.

Suitable hydrogen peroxide donor compounds are for example alkali metal perborates or percarbonates.

Suitable organic hydroperoxides are for example cumene hydroperoxide or alkyl hydroperoxides, in particular tert-butyl hydroperoxide.

Suitable percarboxylic acids are for example peracetic acid, m-chloroperbenzoic acid, magnesium bis (monoperoxyphthalate) hexahydrate and 1,12-dodecanediperoic acid.

The use of hydrogen peroxide, tert-butyl hydroperoxide or magnesium bis(monoperoxyphthalate) hexahydrate is preferable.

If hydrogen peroxide is used as oxidizing agent, it is in general employed in the form of a 10–70% strength by weight aqueous solution.

Organic hydroperoxides are in general used in the form of an about 70% strength by weight aqueous solution.

Magnesium bis(monoperoxyphthalate) hexahydrate can be used in solid form, as an aqueous solution or as an aqueous suspension.

In some cases it can also be of advantage to carry out the process additionally in the presence of small amounts (in general up to 2 mol %, based on the leuco compound II) of a compound which stabilizes the oxidizing agent, eg. ethylenediaminetetraacetic acid, diethylenetriaminepentaacetic acid nitrilotriacetic acid, β-alaninediacetic acid, isoserinediacetic acid, ethylenediaminetetra(methylenephosphonic acid), hexamethylenediaminetetra (methylenephosphonic acid), diethylenetriaminepenta(methylenephosphonic acid) or alkali metal salts thereof, trimethylacetic acid, p-toluenesulfonic acid, sodium silicate, acetate, sodium fluoride, cyanamide or ascorbic acid and/or an N-containing aromatic heterocycle, eg. imidazole, N-methylimidazole, pyridine, pyrazole, pyrrole or 1,3,4-triazole.

The amount of oxidizing agent used per mole of leuco compound of the formula II is in general from 1 to 5 mol, preferably from 1.5 to 4 mol, in particular from 1.5 to 2.5 mol, of hydrogen peroxide, from 0.9 to 3 mol, preferably from 1 to 2 mol, in particular from 1 to 1.5 mol, of organic hydroperoxide or from 0.9 to 3 mol, preferably from 1 to 2 mol, of percarboxylic acid (in each case based on a peroxycarboxyl radical).

The oxygen transfer catalyst which contains a complexed heavy metal ion is in general used in an amount of from 0.1 to 5 mol %, preferably from 1 to 3 mol %, each percentage being based on the leuco compound II.

Suitable diluents are for example water, glacial acetic acid, chloroform, toluene, N,N-dimethylformamide, N-methylpyrrolidone, alcohols, such as methanol, ethanol, propanol, isopropanol, butanol, isobutanol, glycols, such as ethylene glycol or propylene glycol, or mixtures thereof.

Preference is given to using water or mixtures of water with glacial acetic acid, alcohols or glycols.

The use of water as diluent is particularly preferable.

Two-phase mixtures, resulting for example from using water and a solvent of little if any miscibility with water, are optionally provided with a phase transfer catalyst. Suitable phase transfer catalysts are the customary products known per se, such as tetraalkylammonium halides or benzyltrialkylammonium halides or hydrogen sulfates.

The novel process is in general carried out under atmospheric pressure and at from 20° to 100° C., preferably at from 40° to 90° C. It can be carried out not only continuously but also batchwise.

The novel process is advantageously carried out by introducing the leuco compound II and the diluent as initial charge, in general in a weight ratio of leuco compound II:diluent of from 1:10 to 2:1, preferably from 3:7 to 3:2. Then the catalyst is added, followed by the oxidizing agent or an aqueous solution thereof, metered into the mixture with thorough stirring. The oxidation then takes place with stirring at the abovementioned temperature.

On completion of the addition of the oxidizing agent the reaction will in general have ended. The reaction mixture is brought to 20°–80° C. and subsequently stirred for a further 10–120 minutes. The target product can then be separated off in a conventional manner, for example by removing the solvent to dryness or by salting out with sodium sulfate, and if necessary be redissolved and reprecipitated once more.

The process of the invention is simple to carry out and gives the dyes of the formula I in high yield and purity.

Further advantages of the novel process are an oxidizing agent that is free of heavy metal and a short reaction time.

The dyes of the formula I are useful for coloring paper and for application in sanitary protection.

The invention will now be more particularly described by way of example.

EXAMPLE 1

To 96.3 g (50 mmol) of a 40% strength by weight aqueous solution of 4',4"-bis[N-ethyl-N-(3-hydroxysulfonylbenzyl)amino]triphenylmethane-2-sulfonic acid, sodium salt, were added 0.34 g (1 mmol) of iron-5,14-dihydrodibenzo[b,i][5,9,14,18]tetraaza[14]annulene, 0.44 g (1 mmol) of ethylenediaminetetra(methylenephosphonic acid) and 0.08 g (1 mmol) of N-methylimidazole, followed by 11.4 g (100 mmol) of 30% strength by weight aqueous hydrogen peroxide added dropwise with vigorous stirring at 80° C. over 25 minutes. After the reaction mixture has been cooled down to 60° C., the solution was stirred for a further hour and then filtered. The filtrate was adjusted with sodium hydroxide solution to pH 4. Removal of water and subsequent drying left 43.5 g of dye.

EXAMPLE 2

To 96.3 g (50 mmol) of a 40% strength by weight aqueous solution of 4',4"-bis[N-ethyl-N-(3-hydroxysulfonylbenzyl)amino]triphenylmethane-2-sulfonic acid, sodium salt, were added 0.34 g (1 mmol) of iron-5,14-dihydrodibenzo[b,i][5,9,14,18]tetraaza[14]annulene, 0.28 g (1 mmol) of ethylenediaminetetraacetic acid and 0.08 g (1 mmol) of N-methylimidazole, followed by 9.66 g (75 mmol) of t-butyl hydroperoxide (70% strength by weight, aqueous) added dropwise with vigorous stirring over 25 minutes at 40° C. The reaction mixture was additionally stirred at 40° C. for one hour and then filtered. The solution was adjusted with sodium hydroxide solution to pH 4. Removal of water and subsequent drying left 45.3 g of dye.

EXAMPLE 3

To 96.3 g (50 mmol) of a 40% strength by weight aqueous solution of 4',4"-bis[N-ethyl-N-(3-hydroxysulfonylbenzyl)amino]triphenylmethane-2-sulfonic acid, sodium salt, was added 0.34 g (1 mmol) of iron-5,14-dihydrodibenzo[b,i][5,9,14,18]tetraaza[14]annulene, followed by a solution of 24.19 g (45 mmol) of magnesium bis(monoperoxyphthalate) hexahydrate (85% strength by weight) in 200 ml of water added dropwise with vigorous stirring over 25 minutes at 90° C. After the reaction mixture had been cooled to 60° C., it was stirred for a further hour and then filtered. Sodium sulfate was added to salt out the dye, and the precipitate was separated off hot from the aqueous phase. The dye resin was dissolved in water. The solution was adjusted with a sodium hydroxide solution to pH 4. Removal of water and subsequent drying left 52.8 g of salt-containing dye.

The method of the preceding examples can also be used to oxidize the leuco compounds of the formula

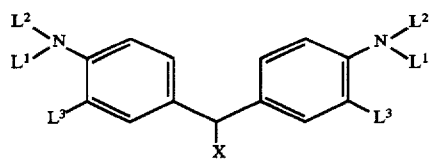

| Ex. No. | $L^1$ | $L^2$ | $L^3$ | X | Color |
|---|---|---|---|---|---|
| 4 | $C_2H_5$ | $C_2H_5$ | H | H | blue |
| 5 | $C_2H_4OH$ | $C_2H_4OH$ | H | ![2,6-dichlorophenyl] | blue |
| 6 | $C_2H_4OH$ | $C_2H_4OH$ | H | ![2-chlorophenyl] | blue |
| 7 | $C_2H_4OH$ | $C_2H_4OH$ | H | $C_6H_5$ | greenish blue |
| 8 | $C_2H_5$ | H | $CH_3$ | ![2-chlorophenyl] | blue |
| 9 | $C_2H_5$ | $C_2H_5$ | H | ![sulfonated phenyl with $SO_3^{\ominus}$ and $SO_3Na$] | blue |

-continued

| Ex. No. | L¹ | L² | L³ | X | Color |
|---|---|---|---|---|---|
| 10 | C₂H₅ | C₂H₅ | H | 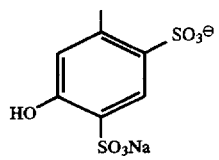 | blue |

We claim:

1. A process for preparing dyes of formula (I)

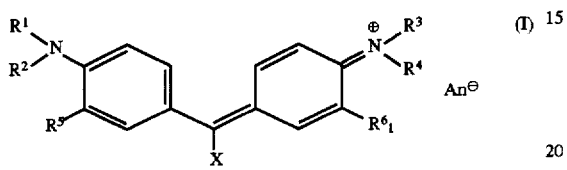

where
- $R^1$, $R^2$, $R^3$ and $R^4$ are independently of one another $C_1$–$C_8$-alkyl, which may be substituted and may be interrupted by from 1 to 3 oxygen atoms in an ether function, phenyl or $C_1$–$C_4$-alkylphenyl,
- $R^5$ and $R^6$ are independently of one another hydrogen or methyl,
- X is hydrogen, substituted or unsubstituted phenyl or substituted or unsubstituted naphthyl, and
- An⊖ is an anion, by oxidation of a leuco compound of the formula (II)

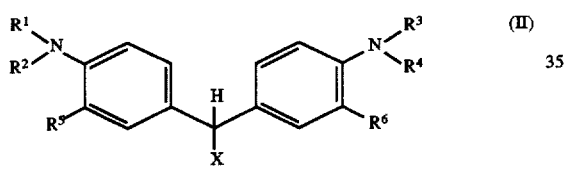

where $R^1$, $R^2$, $R^3$, $R^4$, $R^5$, $R^6$ and X are each as defined above, in the presence consisting essentially of a diluent and of an oxygen transfer catalyst which contains a complexed heavy metal ion, which consists essentially of hydrogen peroxide, a hydrogen peroxide donor compound, an organic hydroperoxide or a percarboxylic acid as oxidizing agent, and as the oxygen transfer catalyst a member of the class of porphyrins, tetraaza[14]annulenes, phthalocyanines or tetraazacyclodecanes.

2. A process as claimed in claim 1, wherein $R^5$ and $R^6$ are each hydrogen.

3. A process as claimed in claim 1, wherein $R^1$, $R^2$, $R^3$ and $R^4$ are each substituted or unsubstituted $C_1$–$C_4$-alkyl.

4. A process as claimed in claim 1, wherein X is hydrogen or substituted or unsubstituted phenyl.

5. A process as claimed in claim 1, wherein the heavy metal ion complexed within the oxygen transfer catalyst is derived from iron, manganese, cobalt or chromium.

6. The method of claim 1, wherein said hydrogen peroxide donor is an alkali metal-perborate or percarbonate.

7. A process for preparing a dye of the formula (I)

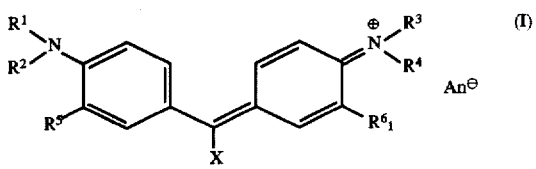

wherein
- $R^1$, $R^2$, $R^3$ and $R^4$ are independently $C_1$–$C_8$-alkyl, which may be substituted and may be interrupted by from 1 to 3 oxygen atoms in an ether function, phenyl or $C_1$–$C_4$-alkylphenyl,
- $R^5$ and $R^6$ are independently of one another hydrogen or methyl,
- X is hydrogen, substituted or unsubstituted phenyl or substituted or unsubstituted naphthyl, and
- An⊖ is an anion, comprising
oxidizing a leuco compound of the formula (II)

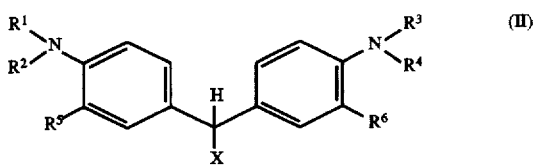

where $R^1$, $R^2$, $R^3$, $R^4$, $R^5$, $R^6$ and X are each as defined above, in the presence consisting essentially of
(a) a diluent,
(b) an oxidizing agent selected from the group consisting of hydrogen peroxide, a hydrogen peroxide donor compound, an organic hydroperoxide and a percarboxylic acid and
(c) an oxygen transfer catalyst consisting essentially of
  (i) a compound selected from the group of porphyrins, tetraaza[14]annulenes, phthalocyanines and tetraazacyclodecanes and
  (ii) a heavy metal complexed therein.

8. The method of claim 7 wherein said hydrogen peroxide donor compound is an alkali metal perborate or percarbonate.

* * * * *